United States Patent
Adiprasito et al.

(10) Patent No.: US 11,485,382 B2
(45) Date of Patent: Nov. 1, 2022

(54) CONTROL UNIT AND METHOD FOR OPERATING A DRIVING FUNCTION AT A SIGNALLING INSTALLATION

(71) Applicant: Bayerische Motoren Werke Aktiengesellschaft, Munich (DE)

(72) Inventors: Bartono Adiprasito, Tiefenbach (DE); Florian Kohlhuber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/978,269

(22) PCT Filed: Feb. 26, 2019

(86) PCT No.: PCT/EP2019/054754
§ 371 (c)(1),
(2) Date: Sep. 4, 2020

(87) PCT Pub. No.: WO2019/170478
PCT Pub. Date: Sep. 12, 2019

(65) Prior Publication Data
US 2021/0001879 A1 Jan. 7, 2021

(30) Foreign Application Priority Data
Mar. 7, 2018 (DE) ..................... 10 2018 203 353.6

(51) Int. Cl.
*B60W 60/00* (2020.01)
*G01C 21/00* (2006.01)
(Continued)

(52) U.S. Cl.
CPC .......... *B60W 60/001* (2020.02); *B60W 10/18* (2013.01); *B60W 30/18109* (2013.01);
(Continued)

(58) Field of Classification Search
CPC ............... B60W 60/001; B60W 10/18; B60W 30/18109; B60W 30/18154;
(Continued)

(56) References Cited

U.S. PATENT DOCUMENTS

2013/0253754 A1 9/2013 Ferguson et al.
2018/0112997 A1* 4/2018 Fasola ................ G01C 21/3407
2018/0326982 A1* 11/2018 Paris ...................... G08G 1/166

FOREIGN PATENT DOCUMENTS

DE          103 34 620 A1   2/2005
DE   10 2013 220 662 A1    4/2015
(Continued)

OTHER PUBLICATIONS

International Search Report (PCT/ISA/210) issued in PCT Application No. PCT/EP2019/054754 dated May 8, 2019 with English translation (five (5) pages).
(Continued)

*Primary Examiner* — Nicholas Kiswanto
*Assistant Examiner* — Jamal A Shah
(74) *Attorney, Agent, or Firm* — Crowell & Moring LLP

(57) ABSTRACT

A control unit for a vehicle is configured to detect a signalling installation ahead, wherein the signalling installation has at least one signal transmitter. The control unit is configured to ascertain digital map information indicating and/or allowing an association between the at least one signal transmitter and at least one possible direction of travel of the vehicle at the signalling installation. The control unit is further configured to operate a driving function of the vehicle on the basis of the digital map information.

14 Claims, 2 Drawing Sheets

(51) Int. Cl.
*B60W 10/18* (2012.01)
*B60W 30/18* (2012.01)
*G01C 21/34* (2006.01)
*G08G 1/0967* (2006.01)
*B60W 10/04* (2006.01)
*B60W 10/20* (2006.01)
*B60W 30/09* (2012.01)
*B60W 30/095* (2012.01)

(52) U.S. Cl.
CPC ... *B60W 30/18154* (2013.01); *G01C 21/3407* (2013.01); *G01C 21/3863* (2020.08); *G08G 1/096725* (2013.01); *G08G 1/096783* (2013.01); *B60W 10/04* (2013.01); *B60W 10/20* (2013.01); *B60W 30/09* (2013.01); *B60W 30/0956* (2013.01); *B60W 2420/42* (2013.01); *B60W 2420/52* (2013.01); *B60W 2555/00* (2020.02)

(58) Field of Classification Search
CPC .. B60W 2555/00; B60W 10/04; B60W 10/20; B60W 30/09; B60W 30/0956; B60W 2420/42; B60W 2420/52; G01C 21/3863; G01C 21/3407; G08G 1/096725; G08G 1/096783

See application file for complete search history.

(56) References Cited

FOREIGN PATENT DOCUMENTS

| | | |
|---|---|---|
| DE | 10 2014 013 672 A1 | 4/2015 |
| DE | 10 2016 005 227 A1 | 10/2016 |
| DE | 10 2015 214 622 A1 | 2/2017 |
| EP | 2 650 857 A1 | 10/2013 |
| EP | 2 944 532 A2 | 11/2015 |

OTHER PUBLICATIONS

German-language Written Opinion (PCT/ISA/237) issued in PCT Application No. PCT/EP2019/054754 dated May 8, 2019 (six (6) pages).

German-language Search Report issued in German Application No. 10 2018 203 353.6 dated May 14, 2019 with partial English translation (12 pages).

\* cited by examiner

CONTROL UNIT AND METHOD FOR OPERATING A DRIVING FUNCTION AT A SIGNALLING INSTALLATION

BACKGROUND AND SUMMARY OF THE INVENTION

The invention relates to a control unit and to a corresponding method for providing a driving function, in particular a driver assistance function, of a vehicle in connection with a signaling installation.

A vehicle may have one or more driving functions which assist the driver of the vehicle when guiding, in particular longitudinally guiding, the vehicle. For example, a brake assistant can cause automatic braking of the vehicle ahead of an obstacle. In this case, the obstacle may possibly also be a red traffic light which has been captured using one or more environmental sensors of the vehicle.

Traffic light installations may have a very different set-up at different intersections and/or in different countries. The different set-up of traffic light installations may result in inaccuracies when detecting signals which are relevant to a particular vehicle. As a result, the reliability and/or the comfort of a driving function may be impaired.

The present document deals with the technical object of increasing the reliability and/or the comfort of a driving function of a vehicle with respect to a signaling installation.

The object is achieved by means of the independent claims. Advantageous embodiments are described, inter alia, in the dependent claims. It is pointed out that additional features of a patent claim dependent on an independent patent claim can form, without the features of the independent patent claim or only in combination with a subset of the features of the independent patent claim, a separate invention which is independent of the combination of all features of the independent patent claim and can be made the subject matter of an independent claim, a divisional application or a subsequent application. This applies, in the same manner, to technical teachings which are described in the description and can form an invention independent of the features of the independent patent claims.

One aspect describes a control unit for a vehicle (in particular for a road motor vehicle). The control unit is configured to detect an upcoming signaling installation, wherein the signaling installation comprises at least one signal transmitter (also referred to as a traffic light in this document). The signaling installation may be arranged, for example, at an entrance to an intersection of a plurality of roads. In this case, the signaling installation may be configured to enable or block different possible directions of travel across the intersection at different times.

The vehicle may comprise one or more environmental sensors which are configured to capture sensor data relating to the environment of the vehicle. The signaling installation can be detected on the basis of the sensor data. Alternatively or additionally, the control unit can resort to digital map information relating to a road network used by the vehicle, wherein the digital map information indicates the position of different signaling installations. The upcoming signaling installation (on a trajectory or a route of the vehicle) can then be determined (possibly also) on the basis of the digital map information.

A signal transmitter may comprise, for example, one or more light signals which may possibly have different colors. In particular, a signal transmitter may have a light signal of a first color (for example green) which is used to indicate that a vehicle can enter an intersection. Furthermore, a signal transmitter may have a light signal of a second color (for example red) which is used to indicate that a vehicle should stop at the stop line of the signal transmitter.

Furthermore, a signaling installation may comprise one or more signal groups. In this case, a signal group can be considered to be a group of signal transmitters or traffic lights which switch at the same time and therefore have the same active light signals at the same time. A signal group may possibly be allocated to precisely one possible direction of travel. Alternatively, a signal group may be allocated to a plurality of different possible directions of travel.

The signaling installation may comprise a plurality of signal transmitters which are assigned to at least partially different possible directions of travel. In particular, the different signal transmitters can be used to control the possible direction of travel in which an intersection can be driven through at a particular time. Exemplary possible directions of travel are: turning left, driving straight ahead or turning right. The vehicle may approach the signaling installation (and the intersection behind it) on a road. The signaling installation can then have different signal transmitters at different positions (which typically run transversely with respect to the road), which signal transmitters can be assigned to at least partially different possible directions of travel.

The control unit may be configured to determine digital map information which indicates and/or enables an assignment of the at least one signal transmitter to at least one possible direction of travel of the vehicle at the signaling installation. In particular, the respective assignment to a possible direction of travel can be indicated in the digital map information for each of a plurality of different signal transmitters. The digital map information can indicate this information for different signaling installations in a road network, if appropriate.

The digital map information may be based on sensor data relating to the signaling installation which have been captured in advance by one or more environmental sensors of at least one vehicle (possibly of another vehicle and/or possibly of the same vehicle). In particular, the assignment between the signal transmitter and the possible direction of travel may have been learnt in advance on the basis of sensor data and may have been stored as digital map information. In this case, the sensor data may have been captured by one or more other vehicles (and vehicles which do not have the driving function described in this document). In this case, the digital map information may be stored in a storage unit of the vehicle. Alternatively or additionally, the digital map information may be received or may have been received from a unit outside the vehicle (for example from a back-end server) via a communication unit of the vehicle.

The control unit is also configured to operate a driving function of the vehicle on the basis of the digital map information. In this case, the driving function may comprise at least partially automated longitudinal and/or lateral guidance of the vehicle. In particular, the driving function may comprise deceleration of the vehicle until reaching the signaling installation. In other words, the driving function may comprise or be a braking assistance function with respect to the signaling installation. Alternatively or additionally, the driving function may comprise automated (re-)starting of the vehicle at the signaling installation. In this case, the driving function may be carried out or possibly terminated in the region of the signaling installation on the basis of the digital map information (in particular on the basis of the reliability of the digital map information).

The comfort and the reliability and the availability of a driving function of a vehicle in the region of a signaling installation can be increased by providing and taking into account digital map information which indicates the assignment of signal transmitters of a signaling installation to directions of travel.

The control unit may be configured to determine a relevant signal transmitter of the signaling installation which is relevant to a planned direction of travel of the vehicle on the basis of the digital map information. In particular, the relevant signal transmitter may be selected from a plurality of signal transmitters of the signaling installation on the basis of the planned direction of travel of the vehicle. The driving function can then be operated on the basis of the relevant signal transmitter. The planned direction of travel may result, for example, from a route planned in a navigation system of the vehicle.

The control unit may be configured to determine a status (that is to say a signaling state) of the relevant signal transmitter. The status may indicate, for example, which light signal of the relevant signal transmitter is activated (for example whether the traffic light is red or green). In this case, the current status of the relevant signal transmitter can be determined on the basis of the sensor data from the one or more environmental sensors of the vehicle. The driving function of the vehicle can then be operated on the basis of the status of the relevant signal transmitter. For example, the vehicle can be automatically braked if the relevant signal transmitter indicates that the vehicle is intended to stop at the stop line of the signal transmitter. On the other hand, automatic braking may not take place if the relevant signal transmitter indicates that the planned direction of travel of the vehicle has been enabled. The comfort and the reliability of a driving function in the region of a signaling installation can therefore be increased further.

The control unit may be configured to determine that the signal transmitter relevant to the planned direction of travel of the vehicle cannot be determined with sufficient reliability. In this case, it is possible to initiate a manual transfer for guiding the vehicle to the driver of the vehicle. For example, it is possible to effect an output to a driver of the vehicle indicating that the driving function cannot be automatically carried out since the relevant signal transmitter cannot be determined with sufficient reliability. Alternatively, at least temporary deactivation of the driving function can be initiated in this case. Alternatively, a request relating to the automated performance of the driving function can be output to the driver of the vehicle in this case. The driving function can then be carried out in an automated manner in response to appropriate feedback from the driver. On the other hand, the control unit may be configured to determine that the signal transmitter relevant to the planned direction of travel of the vehicle can be determined with sufficient reliability. In this case, the driving function can be operated on the basis of the (current) status of the relevant signal transmitter.

A tiered behavior of the driving function can therefore be provided. In this case, the tiered behavior of the driving function can be effected on the basis of the reliability with which the relevant signal transmitter can be determined. If it is determined, for example, that the reliability is higher than a first (relatively high) reliability threshold value, the driving function can be automatically carried out. If it is determined, for example, that the reliability is between a second (reduced) reliability threshold value and the first reliability threshold value, it is possible to effect an output to the user of the vehicle with the information that the driving function can be carried out in an automated manner after approval by the user. If it is determined, for example, that the reliability is below the second (reduced) reliability threshold value, the driver of the vehicle can be prompted to manually take over the driving task. A comfortable driving function with relatively high availability can therefore already be provided in a transitional phase (if the digital map information at least partially has a reduced quality).

The behavior of the driving function can be determined, if necessary, in advance and/or already at an early stage on the basis of the digital map information. For example, it is already possible to determine at an early stage before reaching a signaling installation how the driving function will behave at the signaling installation (for example automated, automated after approval by the driver or manually by the driver).

For example, the digital map information may indicate data with a different quality or accuracy for different signaling installations. If appropriate, no data relating to the signal transmitters of the signaling installations may be indicated for one or more signaling installations. If appropriate, it is possible to indicate, for one or more other signaling installations, that the signaling installations are complex signaling installations with a plurality of different signal transmitters, but a unique assignment between signal transmitters and possible directions of travel is not yet known. If appropriate, it is possible to indicate, for one or more other signaling installations, that the signaling installations each have a plurality of signal transmitters, but these signal transmitters respectively form a signal group which applies to one or more possible directions of travel (possibly for all possible directions of travel). If appropriate, a unique assignment between signal transmitters and possible directions of travel may be indicated for one or more other signaling installations. The reliability with which the signal transmitter relevant to the planned direction of travel of the vehicle can be determined typically depends on the quality or accuracy of the digital map information provided.

The control unit can compare or merge the sensor data from the one or more environmental sensors of the vehicle with the digital map information in order to determine the signal transmitter relevant to the planned direction of travel of the vehicle. The comparison between sensor data and digital map information makes it possible to determine the relevant signal transmitter, with a relatively high degree of reliability, possibly even with a relatively low quality or accuracy of the digital map information.

The control unit may be configured to determine the possible direction of travel assigned to the at least one signal transmitter solely on the basis of the sensor data from the one or more environmental sensors of the vehicle only when the sensor data have been or are captured at a distance from the signaling installation which is less than or equal to a distance threshold value (for example because an arrow which indicates the possible direction of travel of a signal transmitter otherwise cannot be captured with sufficient accuracy). On the other hand, the control unit may be configured to already determine the possible direction of travel assigned to the at least one signal transmitter on the basis of the digital map information when the vehicle is still at a distance from the signaling unit by more than the distance threshold value. The relevant signal transmitter can therefore already be determined at an early stage on the basis of the digital map information. In particular, the relevant signal transmitter can be detected at an early stage and reliably within the sensor data from the one or more environmental sensors of the vehicle on the basis of the digital map information. The comfort, the availability and the reliability of a driving function can therefore be increased.

As already stated above, the digital map information relating to the signaling installation may be determined on the basis of the sensor data from one or more vehicles. The control unit of a vehicle may be configured to determine a form of one or more features of the signaling installation on the basis of the sensor data during a journey past the signaling installation. The one or more features may comprise: a number of different signal transmitters of the signaling installation; and/or a position of the one or more different signal transmitters of the signaling installation; and/or an assignment of a signal transmitter of the signaling installation to a possible direction of travel at the signaling installation. Furthermore, the control unit of a vehicle may be configured to store the determined form of the one or more features of the signaling installation as digital map information and/or to provide or use it to determine digital map information. It is therefore possible to provide reliable digital map information relating to a signaling installation, as a result of which the reliability and the comfort of a driving function can be increased.

The digital map information can indicate that the signaling installation has only one (single) signal group which applies to all possible directions of travel at the signaling installation. This information can be indicated in a particularly efficient manner (for example by means of a set bit in the digital map information). Furthermore, this information can be determined in a reliable manner on the basis of a relatively small number of crossings of the signaling installation. If the digital map information indicates that the signaling installation has only one single signal group, this makes it possible to uniquely assign a detected signal transmitter to a (in particular all) possible direction(s) of travel at the signaling installation. The status or the signaling state of the signal transmitter relevant to the planned direction of travel of the vehicle can therefore be determined with a high degree of reliability (in particular with up to 100% reliability).

Alternatively or additionally, the digital map information can indicate the number of different signal groups of the signaling installation. For example, the digital map information can indicate that the signaling installation has precisely two different signal groups. This information can assist the control unit of the vehicle with assigning the status of the signal transmitters of the signaling installation, which are captured using sensors, to the different possible directions of travel. It is therefore possible to increase the reliability with which the status of the signal transmitter relevant to the direction of travel of the vehicle can be determined (possibly up to 100%).

Alternatively or additionally, the digital map information can indicate the (precise) assignment of different signal transmitters and/or different signal groups of the signaling installation to different (possibly all) possible directions of travel at the signaling installation. Alternatively or additionally, the digital map information may indicate information relating to the relative positioning of different (possibly all) signal transmitters and/or signal groups of the signaling installation with respect to one another. Such detailed information relating to a signaling installation typically makes it possible to determine the status or the signaling state of the signal transmitter relevant to the planned direction of travel with a high degree of reliability (up to 100%). As a result, a driving function (for example a braking maneuver or a starting maneuver) can be carried out in an automated manner with a high degree of probability.

The control unit may be configured to determine a route of the vehicle. For example, at the beginning of a journey, a destination can be input on a navigation system of the vehicle. A route for the vehicle can then already be determined in advance. Furthermore, the control unit may be configured to detect a multiplicity of signaling installations on the route before the journey along the route. In this case, the signaling installations can be determined or detected on the basis of digital map information which indicates the position of signaling installations in a road network.

The control unit may also be configured to determine digital map information for the multiplicity of signaling installations before the journey along the route, wherein the digital map information indicates and/or enables an assignment of signal transmitters to at least one possible direction of travel of the vehicle at the respective signaling installation for at least one or more of the multiplicity of signaling installations.

It is then possible to already determine, before the journey along the route, on the basis of the digital map information for the multiplicity of signaling installations, whether or not the driving function can be operated in an automated manner on the (entire) journey along the route. In particular, a reliability value can be determined on the basis of the digital map information, which reliability value indicates the reliability with which it is possible to determine a unique assignment between signal transmitters or signal groups and possible directions of travel at the respective signaling installation. If it is determined that there is no sufficiently high (average) reliability for the route, automated performance of the driving function can be prevented for the entire route (possibly after querying a user of the vehicle). On the other hand, the driving function can be carried out in an automated manner, possibly for the entire route. The comfort for a user of the vehicle can therefore be increased further (since the vehicle exhibits a uniform driving behavior along the entire journey).

A further aspect describes a control unit for a vehicle. The aspects described in this document can also be used for this control unit.

The control unit is configured to detect an upcoming signaling installation (for example on the basis of sensor data and/or on the basis of digital map information). In this case, the signaling installation comprises at least one signal transmitter.

The control unit is also configured to determine a reliability value which indicates the reliability with which a signaling state or status of the signaling installation (in particular of the signal transmitter of the signaling installation) that is relevant to the (planned) direction of travel of the vehicle can be determined. For this purpose, it is possible to determine digital map information which indicates and/or enables an assignment of the at least one signal transmitter to at least one possible direction of travel of the vehicle at the signaling installation. Alternatively or additionally, it is possible to determine sensor data relating to the at least one signal transmitter. The reliability value can then be determined on the basis of the digital map information and/or on the basis of the sensor data.

The control unit may be configured to operate a driving function of the vehicle, in particular an automatic braking maneuver at the signaling installation or an automatic starting maneuver at the signaling installation, on the basis of the reliability value.

In particular, the control unit may be configured to determine, on the basis of the reliability value, whether or not the signaling state of the signaling installation (in particular of the signal transmitter of the signaling installation) that is relevant to the direction of travel of the vehicle can be determined with a sufficiently high degree of reliability for automatically carrying out the driving function.

An output to a user of the vehicle can then be generated, in particular a confirmation request to confirm the determined signaling state, if it has been determined that the signaling state cannot be determined with a sufficiently high degree of reliability. In this case, the control unit may be configured to automatically carry out the driving function, in particular an automatic braking maneuver at the signaling installation or an automatic starting maneuver at the signaling installation, only when it has been determined that the signaling state can be determined with a sufficiently high degree of reliability or when the determined signaling state has been confirmed by the user of the vehicle. The comfort for a user of the vehicle and the safety of the vehicle can therefore be increased.

One aspect describes a method for operating a driving function of a vehicle. The method comprises detecting an upcoming signaling installation, wherein the signaling installation comprises at least one signal transmitter. The method also comprises determining digital map information which indicates an assignment of the at least one signal transmitter to at least one possible direction of travel of the vehicle at the signaling installation. The method also comprises operating the driving function of the vehicle on the basis of the digital map information.

A further aspect describes a method for determining digital map information relating to a signaling installation. The method comprises capturing sensor data during a journey past the signaling installation using one or more environmental sensors of a vehicle. The method also comprises determining a form of one or more features of the signaling installation on the basis of the sensor data, wherein the one or more features comprise an assignment of a signal transmitter of the signaling installation to a possible direction of travel at the signaling installation. The method also comprises determining digital map information relating to the signaling installation on the basis of the determined form of the one or more features of the signaling installation.

A further aspect describes a road motor vehicle (in particular an automobile or a truck or a bus or a motorcycle) which comprises the control unit described in this document.

A further aspect describes a software (SW) program. The SW program can be configured to be executed on a processor (for example on a control device of a vehicle) and to thereby carry out one of the methods described in this document.

A further aspect describes a storage medium. The storage medium may comprise a SW program which is configured to be executed on a processor and to thereby carry out one of the methods described in this document.

It should be noted that the methods, apparatuses and systems described in this document can be used both alone and in combination with other methods, apparatuses and systems described in this document. Furthermore, any aspects of the methods, apparatuses and systems described in this document can be combined with one another in various ways. In particular, the features of the claims can be combined with one another in various ways.

The invention is described in more detail below on the basis of exemplary embodiments.

DETAILED DESCRIPTION OF THE DRAWINGS

As stated at the outset, the present document deals with increasing the reliability, the availability and the comfort of a driving function, in particular a driver assistance system, of a vehicle in connection with a signaling or traffic light installation.

Figure 1:
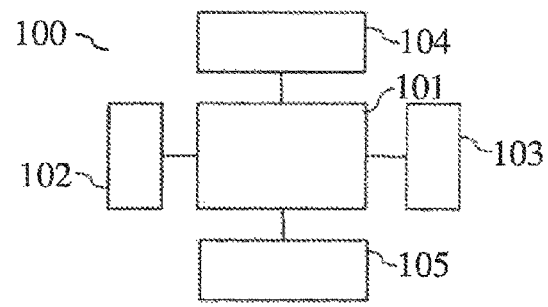
FIG. 1 shows exemplary components of a vehicle.

FIG. 1 shows exemplary components of a vehicle 100. The vehicle 100 comprises one or more environmental sensors 103 (for example one or more imaging cameras, one or more radar sensors, one or more LIDAR sensors, one or more ultrasonic sensors, etc.) which are configured to capture environmental data relating to an environment of the vehicle 100. The vehicle 100 also comprises one or more actuators 102 which are configured to act on the longitudinal and/or lateral guidance of the vehicle 100. Exemplary actuators 102 are: a braking installation, a drive motor, a steering system, etc.

The control unit 101 may be configured to provide a driving function or a driver assistance function on the basis of the sensor data from the one or more environmental sensors 103. For example, an obstacle on the driving trajectory of the vehicle 100 can be detected on the basis of the sensor data. The control unit 101 can then control one or more actuators 102 (for example the braking installation) in order to prevent a collision of the vehicle 100 with the obstacle.

In particular, within the scope of the automated longitudinal guidance of a vehicle 100, speed signs and/or the course of the road can be taken into account in addition to a vehicle in front. Furthermore, the status of a traffic light installation can be taken into account, with the result that the vehicle 100 at a red traffic light relevant to the vehicle's own (planned) direction of travel enables a deceleration to the stop line of the traffic light and/or accelerates (possibly again) in the case of a green traffic light.

Traffic light installations can be designed in a very heterogeneous manner in different countries and can also have a different complexity with respect to the direction of travel/traffic light assignment. Different directions of travel can therefore be controlled in a bundled manner by means of a first group of signals and another direction can be controlled by means of another group of signals. The repeating signals in a group can also be geographically located at different points of an intersection. It can therefore be difficult for a control unit 101 to identify, on the basis of the sensor data, which one or more signals of a traffic light installation (that is to say which signal transmitters and/or signals of a signaling installation) at an intersection are relevant to the planned direction of travel of the vehicle 100 and which are not (in particular if the vehicle 100 is still relatively far away from the traffic light installation).

Figure 2:
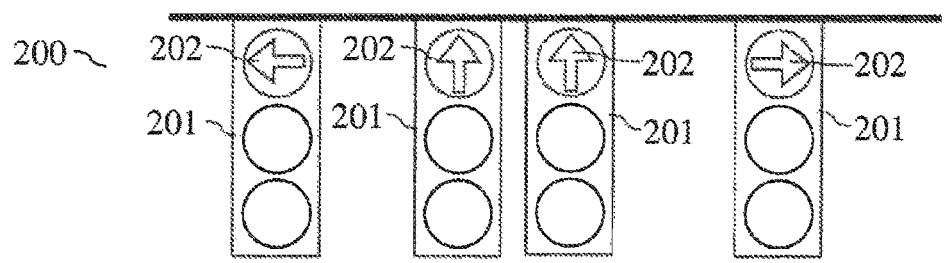
FIG. 2 shows an exemplary signaling installation.

FIG. 2 shows an exemplary signaling or traffic light installation 200. The signaling installation 200 illustrated in FIG. 2 has four different signal transmitters 201 which are arranged at different positions at an entrance to an intersection. The left-hand signal transmitter 201 has an arrow 202 to the left and therefore indicates that this signal transmitter 201 applies to vehicles turning left. The two middle signal transmitters 202 have an upward arrow 202 (or no arrow 202) and therefore indicate that these two signal transmitters 201 apply to a journey straight ahead. The individual light signals from these two signal transmitters 201 form signal groups. Furthermore, the right-hand signal transmitter 201 has an arrow 202 to the right and therefore indicates that this signal transmitter 201 applies to vehicles turning right.

The signaling installation 200 illustrated in FIG. 2 is only one example of many different possible configurations of a signaling installation 200. A signaling installation 200 may have a relatively large number of different forms of features. Exemplary features are
  the number of signal transmitters 201;
  the positions of the one or more signal transmitters 201; and/or
  the assignment of a signal transmitter 201 to a possible direction of travel across an intersection.

Figure 3:
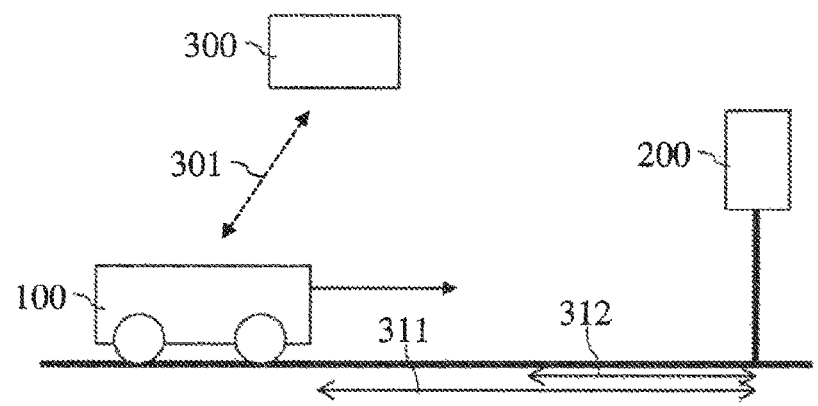
FIG. 3 shows an exemplary traffic situation.

FIG. 3 shows, by way of example, a vehicle 100 which is moving toward a signaling installation 200 on a road. The one or more environmental sensors 103 of the vehicle 100 may be configured to capture sensor data (in particular image data) relating to the signaling installation 200. The sensor data can then be analyzed (for example by means of an image analysis algorithm) in order to determine forms of one or more features of the signaling installation 200. In particular, it is possible to determine, on the basis of the sensor data, which signal transmitter 201 of the signaling installation 200 is relevant to the (planned) direction of travel of the vehicle 100. Furthermore, the status of the relevant signal transmitter 201 (for example the color, for instance red, amber or green) can be determined.

The quality and/or the reliability with which the form of a feature of a signaling installation 200 can be determined on the basis of the sensor data typically depend(s) on the distance 311, 312 between the vehicle 100 and the signaling installation 200. Furthermore, current weather conditions also typically have a substantial influence on the quality and/or the reliability of the determined form of a feature. In addition, the quality and/or reliability may be different for different features. For example, the one or more environmental sensors 103 may be designed in such a manner that a signaling installation 200 and possibly the number of signal transmitters 201 and possibly the status of the individual signal transmitters 201 can already be reliably captured at a first (relatively large) distance 311 on the basis of the sensor data. On the other hand, the reliable detection of the direction of travel of the individual signal transmitters 201 (for example by detecting the illustrated arrows 202) may only be possible at or under a second (relatively short) distance 312. The first distance 311 may be 100-120 m, for example. The second distance 312 may be 40-50 m, for example.

The operation of a driving function of a vehicle 100 may be impaired by the reduced reliability of the determined form of at least one of the features of a signaling installation 200. In particular, the automated longitudinal function of the vehicle 100 may be impaired if it cannot be clearly determined for an upcoming signaling installation 200 which signal transmitter 201 is assigned to the current and/or planned direction of travel of the vehicle 100. In particular, it may not be possible to reliably determine whether the vehicle 100 must brake at the upcoming signaling installation 200 or whether the vehicle 100 can enter the intersection controlled by the upcoming signaling installation 200. This can possibly be determined only when the vehicle 100 is at a relatively short distance 312 from the signaling installation 200, but this can result in reduced comfort for an occupant of the vehicle 100 (for example since a relatively strong deceleration of the vehicle 100 must be effected on account of the relatively short distance 312).

The vehicle 100 may have a storage unit 104 which stores digital map information relating to the road network used by the vehicle 100. The digital map information may indicate forms of one or more features of one or more signaling installations 200 in the road network. In particular, the digital map information for a signaling installation 200 may indicate the assignment of the one or more signal transmitters 201 to different possible directions of travel. In other words, the digital map information can indicate which signal transmitter 201 is responsible for enabling which direction of travel. The digital map information can possibly be received using a communication unit 105 of the vehicle 100 via a wireless communication connection (for example a WLAN or an LTE communication connection).

The control unit 101 of the vehicle 100 may be configured (for example on the basis of the current position of the vehicle 100 and on the basis of a planned route and/or on the basis of the sensor data from the one or more environmental sensors 103) to determine that the vehicle 100 is driving toward an upcoming signaling installation 200. The control unit 101 may also determine the forms of one or more features of the upcoming signaling installation 200 on the basis of the (stored and/or received) digital map information. In particular, it is possible to determine, on the basis of the digital map information, which signal transmitter 201 of the signaling installation 200 is assigned to the current or planned direction of travel of the vehicle 100. In addition, the current status of the assigned signal transmitter 201 can be determined on the basis of the sensor data. An automated driving function (for example automated longitudinal guidance of the vehicle 100) can then be carried out in a reliable and comfortable manner on the basis thereof. In particular, the forms of the one or more relevant features of a signaling installation 200 can therefore already be determined at a relatively great distance 311 of the vehicle 100 from the signaling installation 200, as a result of which the reliability, the availability and the comfort of an automated driving function can be increased.

A vehicle 100 may be configured to use information relating to a signaling installation 200, which is or has been passed by the vehicle 100, to create and/or supplement the digital map information. The digital map information can be created and/or supplemented locally by the vehicle 100 and/or centrally by a central unit 300 (for example by a back-end server) (see FIG. 3). In the immediate vicinity of a signaling installation 200, sensor data which precisely indicate the form of one or more features of the signaling installation 200 can typically be captured by the one or more environmental sensors 103 of a vehicle 100. In particular, the assignment between signal transmitters 201 and possible directions of travel can be determined in a precise and reliable manner in the immediate vicinity on the basis of the captured sensor data.

The vehicle 100 may be configured to transmit the determined information (for example the sensor data and/or the determined forms of the one or more features) to the central unit 300 via a wireless communication connection 301 (in conjunction with an identifier for the respective signaling installation 200, for instance in conjunction with the position of the signaling installation 200). The central unit 300 can then create and update, on the basis of the provided information from a multiplicity of vehicles 100, digital map information which indicates the forms of more features for a multiplicity of different signaling installations 200. The digital map information can then be made available to the individual vehicles 100 in order to assist the operation of automated driving functions (as stated above).

It is therefore possible to learn the intersection complexity and the attributes or the features of an intersection (in particular of the one or more signaling installations 200 of an intersection) by repeatedly crossing with one or more vehicles 100 in order to be able to optimally adapt the functionality of a driving function or an assistance function with respect to a signaling installation 200 of the intersection on the basis of this information.

For example, sensor data relating to the intersection (in particular relating to a signaling installation 200 of the intersection) can be captured via the front cameras 103 of one or more vehicles 100 when crossing an intersection. The signals, the road markings and/or the direction arrows 202 of one or more signal transmitters 201 of the signaling installation 200 can be determined on the basis of the sensor data. In this case, a signal transmitter 201 can be considered to be a set of light signals which control the same one or more directions of travel. An assignment of the different directions of travel to the one or more signal transmitters 201 can therefore be determined on the basis of the sensor data. This information relating to a signaling installation 200 can be stored for subsequent use (for example within the scope of a digital map for a road network).

When carrying out a driving function (for example an automated braking function), the stored information relating to a signaling installation 200 can then be taken into account. In particular, the driving function can be carried out if it is determined that the signaling installation 200 comprises only one signal transmitter 201 (which is therefore relevant to all possible directions of travel). If, in the case of a complex signaling installation 200, the relevant signal transmitter 201 cannot be clearly determined, a request for manual takeover can possibly be sent to a driver of the vehicle 100 or automatic intervention in the driving function can be prevented. On the other hand, if reliable, stored or provided digital map information relating to a signaling installation 200 is available, the driving function can be automatically carried out on the basis of the available information. The operation of an automated driving function can therefore depend on the amount of information (determined in advance) available with respect to a signaling installation 200. In this case, the amount of available information increases with the number of considered crossings of vehicles 100. The degree of automation of a driving function of a vehicle 100 can therefore be continuously increased.

Figure 4A:
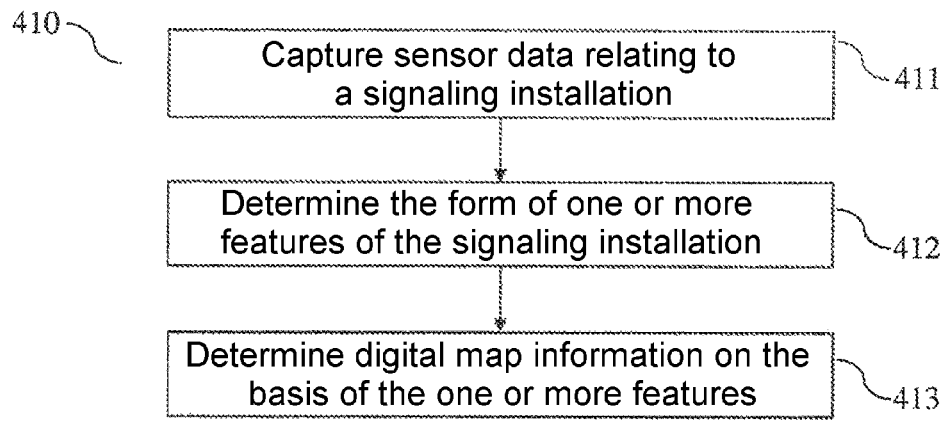
FIG. 4a is a flowchart of an exemplary method for determining digital map information for a road network.

FIG. 4a shows a flowchart of an exemplary method 410 for determining digital (map) information relating to a signaling installation 200. In this case, the digital (map) information can indicate the position of the signaling installation 200 in a road network. The digital (map) information can also indicate the form of one or more (static or invariable) features of the signaling installation 200. The method 410 can be carried out at least partially by one or more vehicles 100 and/or at least partially by a (central) unit 300 outside the vehicle.

The method 410 comprises capturing 411 sensor data during a journey past the signaling installation 200 using one or more environmental sensors 103 of a vehicle 100. In particular, sensor data can be captured during a multiplicity of journeys past the signaling installation 200 and can be used to determine the digital (map) information. The accuracy and the reliability of the digital (map) information can be increased by taking into account the sensor data from a multiplicity of journeys.

The method 410 also comprises determining 412 a form of one or more (static) features of the signaling installation 200 on the basis of the sensor data. In this case, the one or more features may comprise: a number of different signal transmitters 201 of the signaling installation 200 (in this case, a signal transmitter 201 may be a traffic light with one, two or three light signals which can be activated individually or possibly sometimes together); a position of the one or more different signal transmitters 201 of the signaling installation 200; and/or an assignment of a signal transmitter 201 of the signaling installation 200 to a possible direction of travel at the signaling installation 200.

The method 410 also comprises determining 413 (for example updating) digital (map) information relating to the signaling installation 200 on the basis of the determined form of the one or more features of the signaling installation 200. Digital (map) information relating to a signaling installation 200 can therefore be determined and provided in a reliable manner, in particular, on the basis of the sensor data from different vehicles 100. The digital (map) information can be used to improve the operation of a driving function (in particular a driver assistance function) of a vehicle 100 in the region of a signaling installation 200.

Figure 4B:
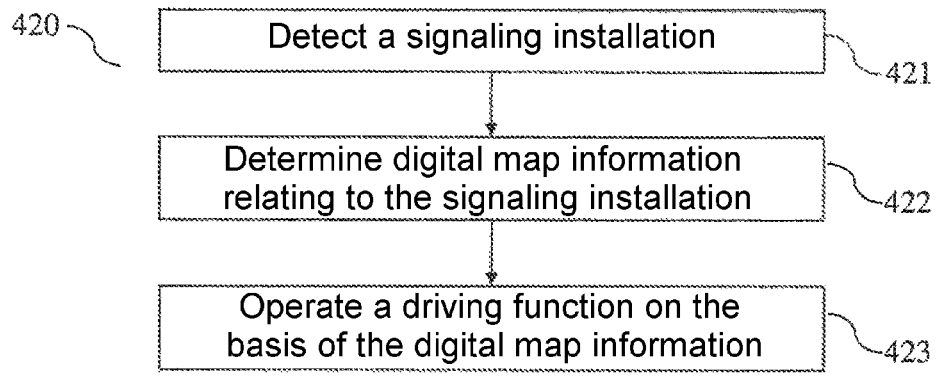
FIG. 4b is a flowchart of an exemplary method for operating a driving function of a vehicle.

FIG. 4b shows a flowchart of an exemplary method 420 for operating a driving function of a vehicle 100. The vehicle function may comprise at least partially automated longitudinal and/or lateral guidance of the vehicle 100. In this case, the method 420 is directed, in particular, to increasing the reliability and/or the comfort of the driving function in the region of a signaling installation 200. The method 420 can be carried out by the control unit 101 of a vehicle 100.

The method 420 comprises detecting 421 an upcoming signaling installation 200. The signaling installation 200 can be detected, for example, on the basis of sensor data from the one or more environmental sensors 103 of the vehicle 100. In this case, the vehicle 100 can be at a distance from the signaling installation 200 which is higher than the second distance threshold value 312 (but less than the first distance threshold value 311).

The signaling installation 200 may comprise at least one signal transmitter 201. In particular, the signaling installation 200 may comprise a plurality of signal transmitters 201 for at least partially different possible directions of travel of the vehicle 100 at the signaling installation 200. In this case, the vehicle 100 may be at a distance from the signaling installation 200 which does not (yet) make it possible to reliably determine the assignment between signal transmitters 201 and possible directions of travel on the basis of the sensor data.

The method 420 also comprises determining 420 digital (map) information (determined and/or provided in advance) which indicates an assignment of the at least one signal transmitter 201 to at least one possible direction of travel of the vehicle 100 at the signaling installation 200. The digital (map) information may be stored on a storage unit 104 of the vehicle 100 and/or may be received or may have been received via a communication unit 105 of the vehicle 100. The digital (map) information may have been determined before carrying out the method 420, for example according to the method 410.

The method 420 also comprises operating 423 the driving function of the vehicle 100 on the basis of the digital (map) information relating to the signaling installation 200. The digital (map) information can possibly indicate with a relatively high degree of reliability the signal transmitter 201 which is relevant to a planned direction of travel of the vehicle 100. In such a case, the driving function can also be carried out in the region of the signaling installation 200. On the other hand, the digital (map) information may possibly not clearly indicate which signal transmitter 201 is relevant to the planned direction of travel of the vehicle 100. In such a case, a takeover request may be output to the driver of the vehicle 100 and/or the driving function can be deactivated at least in the region of the signaling installation 200. The method 420 therefore makes it possible to increase the reliability and/or the comfort of a driving function in the region of a signaling installation 200.

The present invention is not restricted to the exemplary embodiments shown. In particular, it should be noted that the description and the figures are intended to illustrate only the principle of the proposed methods, apparatuses and systems.

What is claimed is:

1. An apparatus for a vehicle, comprising:
    a control unit configured to:
        detect an upcoming signaling installation; wherein the signaling installation comprises at least one signal transmitter;
        determine a reliability value which indicates a reliability with which a signaling state of the signaling installation that is relevant to a direction of travel of the vehicle can be determined;
        determine, on the basis of the reliability value, whether or not the signaling state of the signaling installation that is relevant to the direction of travel of the vehicle can be determined with the reliability value above a first threshold for carrying out the driving function in an automated manner;
        if it has been determined that the signaling state can be determined with the reliability value above the first threshold, carry out the driving function in the automated manner;
        if it has been determined that the signaling state cannot be determined with the reliability value above the first threshold:
            determine, on the basis of the reliability value, whether or not the signaling state can be determined with the reliability value above a second threshold for carrying out the driving function in the automated manner, wherein the second threshold is lower than the first threshold;
            if it has been determined that the signaling state can be determined with the reliability value above the second threshold, generate a first output to a user of the vehicle, in a form of an approval request to carry out the driving function in the automated manner; and
            if it has been determined that the signaling state cannot be determined with the reliability value above the second threshold, generate a second output to the user of the vehicle, in a form of a prompt for the user to manually take over the driving function.

2. The apparatus according to claim 1, wherein the control unit is further configured to:
    determine digital map information which indicates an assignment of the at least one signal transmitter to at least one possible direction of travel of the vehicle at the signaling installation; and
    carry out the driving function of the vehicle on the basis of the digital map information.

3. The apparatus according to claim 2, wherein the control unit is further configured to:
    determine a relevant signal transmitter of the signaling installation, which is relevant to a planned direction of travel of the vehicle, on the basis of the digital map information;
    determine a status of the relevant signal transmitter; and
    carry out the driving function of the vehicle on the basis of the status of the relevant signal transmitter.

4. The apparatus according to claim 3, wherein
    the vehicle comprises one or more environmental sensors which are configured to capture sensor data relating to an environment of the vehicle; and
    the control unit is further configured to determine the status of the relevant signal transmitter on the basis of the sensor data.

5. The apparatus according to claim 3, wherein
    the signaling installation comprises a plurality of signal transmitters which are assigned to at least partially different possible directions of travel; and
    the control unit is further configured to select the relevant signal transmitter from the plurality of signal transmitters on the basis of the planned direction of travel of the vehicle.

6. The apparatus according to claim 2, wherein at least one of:
    the digital map information is based on sensor data relating to the signaling installation which have been captured in advance by an environmental sensor of at least one vehicle;
    the digital map information is stored in a storage unit of the vehicle; and
    the digital map information has been or is received from a unit outside the vehicle via a communication unit of the vehicle.

7. The apparatus according to claim 2, wherein at least one of:
    the driving function comprises at least partially automated longitudinal and/or lateral guidance of the vehicle;
    the driving function comprises possible deceleration of the vehicle until reaching the signaling installation; and
    the driving function comprises automated starting of the vehicle at the signaling installation.

8. The apparatus according to claim 2, wherein
    the vehicle comprises one or more environmental sensors which are configured to capture sensor data relating to an environment of the vehicle;
    the control unit is further configured to determine the possible direction of travel assigned to the at least one signal transmitter solely on the basis of the sensor data only when the sensor data have been captured at a distance from the signaling installation which is less than or equal to a distance threshold value; and
    the control unit is further configured to already determine the possible direction of travel assigned to the at least one signal transmitter on the basis of the digital map information when the vehicle is still at a distance from the signaling unit by more than the distance threshold value.

9. The apparatus according to claim 2, wherein
    the vehicle comprises one or more environmental sensors which are configured to capture sensor data relating to an environment of the vehicle;
    the control unit is further configured to determine a form of one or more features of the signaling installation on the basis of the sensor data during a journey past the signaling installation;

wherein the one or more features comprise:
(i) a number of different signal transmitters of the signaling installation;
(ii) a position of the one or more different signal transmitters of the signaling installation;
(iii) an assignment of a signal transmitter of the signaling installation to a possible direction of travel at the signaling installation; and
the control unit is further configured to store the determined form of the one or more features of the signaling installation as digital map information or to provide or use it to determine digital map information.

10. The apparatus according to claim 2, wherein the digital map information indicates at least one of:
that the signaling installation has only one signal group which applies to all possible directions of travel at the signaling installation;
a number of different signal groups of the signaling installation;
an assignment of different signal transmitters and/or different signal groups of the signaling installation to different possible directions of travel at the signaling installation; and
information relating to a relative positioning of different signal transmitters and/or different signal groups of the signaling installation with respect to one another.

11. The apparatus according to claim 2, wherein the control unit is further configured to:
determine a route of the vehicle;
detect a multiplicity of signaling installations on the route before a journey along the route;
determine digital map information for the multiplicity of signaling installations before the journey along the route; and
already determine, before the journey along the route, whether or not the driving function can be operated in an automated manner on the journey along the route on the basis of the digital map information for the multiplicity of signaling installations.

12. The apparatus according to claim 1, wherein
the driving function is an automatic braking maneuver at the signaling installation or an automatic starting maneuver at the signaling installation.

13. The apparatus according to claim 1, wherein the control unit is further configured to:
determine digital map information which indicates an assignment of the at least one signal transmitter to at least one possible direction of travel of the vehicle at the signaling installation; or
determine sensor data relating to the at least one signal transmitter; and
determine the reliability value on the basis of the digital map information or on the basis of the sensor data.

14. A method for operating a driving function of a vehicle, the method comprising:
detecting an upcoming signaling installation; wherein the signaling installation comprises at least one signal transmitter;
determining a reliability value which indicates a reliability with which a signaling state of the signaling installation that is relevant to a direction of travel of the vehicle can be determined;
determining, on the basis of the reliability value, whether or not the signaling state of the signaling installation that is relevant to the direction of travel of the vehicle can be determined with the reliability value above a first threshold for carrying out the driving function in an automated manner;
if it has been determined that the signaling state can be determined with the reliability value above the first threshold, carrying out the driving function in the automated manner;
if it has been determined that the signaling state cannot be determined with the reliability value above the first threshold:
determining, on the basis of the reliability value, whether or not the signaling state can be determined with the reliability value above a second threshold for carrying out the driving function in the automated manner, wherein the second threshold is lower than the first threshold;
if it has been determined that the signaling state can be determined with the reliability value above the second threshold, generating a first output to a user of the vehicle, in a form of an approval request to carry out the driving function in the automated manner; and
if it has been determined that the signaling state cannot be determined with the reliability value above the second threshold, generating a second output to the user of the vehicle, in a form of a prompt for the user to manually take over the driving function.

* * * * *